J. GODDARD & W. S. HUTCHINGS.
PHOTOGRAPHIC CAMERA.
APPLICATION FILED OCT. 19, 1917.
1,263,228.
Patented Apr. 16, 1918.
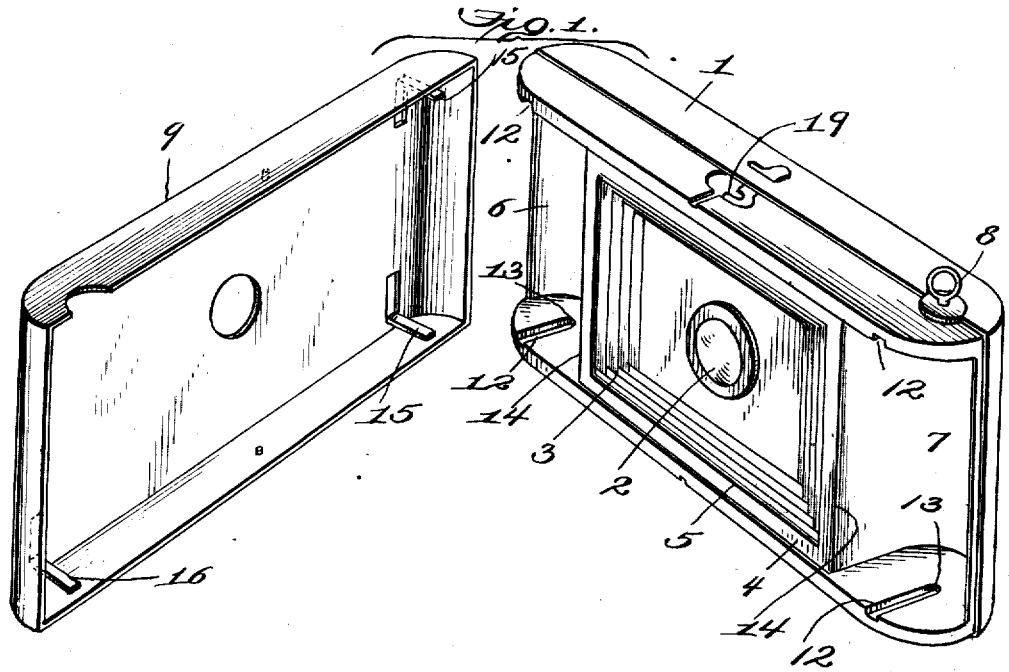
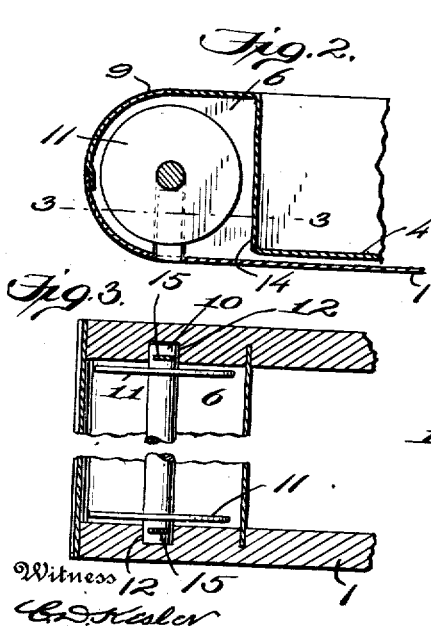
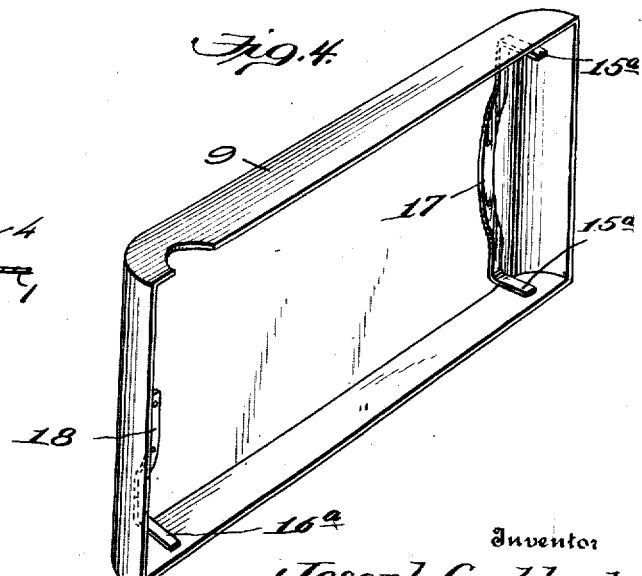
Inventor
Joseph Goddard
William S. Hutchings

UNITED STATES PATENT OFFICE.

JOSEPH GODDARD AND WILLIAM S. HUTCHINGS, OF ROCHESTER, NEW YORK, ASSIGNORS TO SENECA CAMERA MANUFACTURING COMPANY, OF ROCHESTER, NEW YORK, A CORPORATION OF NEW YORK.

PHOTOGRAPHIC CAMERA.

1,263,228.  Specification of Letters Patent.  Patented Apr. 16, 1918.

Application filed October 19, 1917. Serial No. 197,459.

*To all whom it may concern:*

Be it known that we, JOSEPH GODDARD and WILLIAM S. HUTCHINGS, citizens of the United States, residing at Rochester, in the county of Monroe and State of New York, have invented new and useful Improvements in Photographic Cameras, of which the following is a specification.

The present invention relates to improvements in photographic cameras and more especially to those of the roll holding type having compartments for the spools to which the respective ends of the film are attached.

The primary object of the invention is to provide improved means for mounting and retaining the film spools in their respective compartments whereby the construction of the camera is simplified and rendered less expensive, and the operations of loading and unloading the camera are facilitated.

Heretofore, it has been usual to mount the film spools in their respective compartments upon pivots which entered recesses in the ends of the spools, it being necessary to retract one of the pivots for each spool preparatory to the insertion or removal of each spool. Such a construction is relatively expensive and it requires manual manipulation by the user of the camera in loading and unloading it. According to the present invention these disadvantages which have been found to exist are obviated, by providing the opposite inner walls of each spool compartment with grooves or guides leading to appropriately located bearings and adapted to receive and coöperate with pivots which project axially from the ends of each spool to direct such pivots to the bearings in which they rotate, and by providing on the removable back or cover, which normally closes the spool compartments, studs or projections which during application of the back or cover enter the grooves or guides in the casing and coöperate with the projecting pivots of the respective spools to retain the latter in correct position. By arranging the grooves in parallel relation and correspondingly arranging the retaining studs, the latter also serve as guiding means to insure the correct application of the back or cover relatively to the casing. By mounting these spool retaining studs or projections on the removable back or cover, the spools are automatically retained or released by the respective acts of applying and removing the back, hence obviating the necessity of separately manipulating the spool retaining means, as heretofore required.

To these and other ends, the invention consists in certain improvements, and combinations and arrangements of parts, all as will be hereinafter more fully described, the novel features being pointed out particularly in the claims at the end of the specification.

In the accompanying drawing:

Figure 1 is a perspective view showing the rear portion of a roll holding camera and the removable back or cover therefor, the camera embodying spool retaining means constructed in accordance with the present invention.

Fig. 2 represents a section taken through one end of the camera with the back applied thereto showing one of the film spools and the respective retaining means coöperative therewith.

Fig. 3 represents a section on the line 3—3, Fig. 2; and

Fig. 4 is a perspective view of a back provided with spool retaining means of slightly modified form.

Similar parts are designated by the same reference characters in the several views.

The present invention is applicable, generally, to roll holding cameras of the type having compartments for the film spools and a removable back for covering and uncovering such compartment. The preferred embodiments of the invention are shown in the accompanying drawing as applied to a roll holding camera of the folding type, but it is to be understood that the invention is not restricted to the precise constructions shown as equivalent constructions are contemplated and will be included within the scope of the claims.

In the present instance 1 designates the casing of the camera which is equipped, as usual, with a lens 2 and bellows 3, and 4 represents the septum having an opening 5 through which the film located in rear of the septum is exposed by light admitted through the lens in the usual way. Spool compartments 6 and 7 are provided at the ends of the casing at opposite sides of the exposure opening, these compartments being adapted to contain spools to which the respective ends of the sensitized film are attached, the intermediate portion of the film stretching across the exposure opening and the film being advanced by winding it upon one of the spools, it correspondingly unwinding from the other spool. Turning of the film winding spool is effected, as usual, by a winding key 8 which is attached to the casing and is adapted to coöperate with one end of one of the spools. The casing is provided with a removable back 9 which, when applied to the casing, covers the spool compartments and the film passageway in rear of the septum 4, and when this back is removed, the spool compartments are uncovered and thus the exposed film may be removed and a fresh film may be inserted.

The spool retaining means of the present invention are adapted for use in connection with film spools which have pivots 10 projecting axially from their ends and beyond the flanges 11. The opposite walls of each spool compartment are formed with grooves or channels 12 which lead from the rear edge of the casing forwardly to substantially the center of the compartment at which points the grooves terminate to form bearings 13. The grooves 12 of each compartment are parallel with one another and with the grooves of the other compartment. This construction permits a spool to be introduced into its respective compartment by inserting its projecting pivots 10 into the corresponding grooves 12 and then moving the spool forwardly until the pivots 10 on the spool rest in the bearings 13, the spool being then centered appropriately in its compartment.

In feeding the film from one spool to the other spool, the film is stretched angularly across the corners 14 of the septum 4, these corners being offset to the rear of the spools, and the tension on the film acts to pull the spools rearwardly or toward the open ends of the grooves 12. The present invention provides means whereby the spool pivots are retained in the bearings 13 at the forward or inner ends of the grooves 12 automatically or by the act of applying the back to the casing, and they are automatically released when the back is removed, permitting the spools to be removed and others inserted without requiring separate manipulation of the spool retaining means. These results are attained by applying the spool retaining means to the back whereby such means will be moved to and from operative positions automatically by the insertion and removal of the back. Preferably, and as shown, the spool retaining means comprises a suitable number of arms or studs which are attached to the back and are adapted to enter longitudinally the grooves 12 and to bear at their inner ends upon the pivots which project from the ends of the spools. As shown in Figs. 1, 2 and 3, a pair of studs or arms 15 are formed on the back by striking tongues of the metal therefrom and bending such tongues perpendicularly to the back to provide parallel studs which are spaced appropriately to enter the grooves 12 when the back is applied to the casing. A similar but single stud or arm 16 is formed toward the opposite end of the back, this single stud or arm being parallel to the studs or arms 15, and it is adapted to enter the groove 12 which is opposite to the winding key 8, it being unnecessary to provide a retaining stud for the groove 12 which leads to the winding key because the winding key when coupled to the respective end of the spool retains that end of the spool from displacement.

Instead of forming the spool retaining arms directly or integrally from the material composing the back, as in the preceding instance, such retaining arms may be constructed as shown in Fig. 4 wherein the retaining arms 15ª are formed by the forwardly bent ends of a strip 17 which is formed separately from the back and is riveted or otherwise secured thereto, and the single spool retaining arm 16ª is formed by the forwardly directed end of a strip 18 which is riveted or otherwise secured to the back.

According to the present invention, removal of the back withdraws the spool retaining arms and it is only necessary to remove the exposed film from its compartment to unload the camera. The fresh film may then be inserted and the simple act of replacing the cover carries the spool retaining arms into operative position with respect to the spools. These spool retaining arms which coöperate with the axially projecting pivots on the spools sustain the force exerted by the tension on the film which tends to displace the spools, without offering undue friction to the advancement of the film. The back may be retained on the casing by the usual catches 19.

We claim as our invention:

1. A camera comprising a casing having spool compartments adapted to removably support film spools therein, a movable back for the casing adapted to cover and uncover said compartments, and means carried by the back and operative automatically to retain the spools in their respective compartments by movement of the back into closed position.

2. A camera comprising a casing having spool compartments adapted to removably receive and support film spools therein, a back movable relatively to the casing to cover and uncover said compartments, and means operative automatically to retain the spools in their respective compartments when the back is moved into position to close such compartments and movable into non-retaining position by the movement of the back to uncover such compartments.

3. A camera comprising a casing having spool compartments adapted to removably receive film spools, a back movable relatively to the casing to cover and uncover said compartments, and retaining means for the spools movable automatically into inoperative positions by the movement of the back to uncover said compartments.

4. In a camera having a casing provided with compartments to removably receive and rotatably support film spools, and a back movable to cover and uncover said compartments, spool retaining means carried by said back and movable automatically to retain and release said spools by the respective movements of the back to cover and uncover said compartments.

5. A camera comprising a casing having compartments provided with pairs of opposite grooves leading inwardly to receive the axially projecting pivots of the film spools, a back movable relatively to the casing to cover and uncover said compartments and arms carried by the back and movable into said grooves to coöperate with and retain the axially projecting pivots on the spools when the back is moved into position to close said compartments.

In testimony whereof we have hereunto set our hands in presence of two subscribing witnesses.

JOSEPH GODDARD.
WILLIAM S. HUTCHINGS.

Witnesses:
 MARGARET WUEST,
 RUTH POORMAN.